United States Patent [19]
Leinfelder et al.

[11] Patent Number: 6,135,651
[45] Date of Patent: Oct. 24, 2000

[54] PATCHING APPARATUS AND METHOD FOR UPGRADING MODEM SOFTWARE CODE

[75] Inventors: Karl Thomas Leinfelder, Wake Forest; Wesley Hamilton Smith; Sanjay Gupta, both of Raleigh; Navin Jaffer, Chapel Hill, all of N.C.; Shahin Hedayat, San Ramon; Babu Mandava, San Jose, both of Calif.

[73] Assignee: Cirrus Logic, Inc., Fremont, Calif.

[21] Appl. No.: 08/864,802

[22] Filed: May 29, 1997

[51] Int. Cl.[7] .................................................. G06F 9/44
[52] U.S. Cl. ............................................ 395/712; 395/704
[58] Field of Search .................................. 395/712, 705, 395/706, 707, 708, 709, 701, 704

[56] References Cited

U.S. PATENT DOCUMENTS

| | | | |
|---|---|---|---|
| 3,935,535 | 1/1976 | Motley et al. | 325/324 |
| 3,962,637 | 6/1976 | Motley et al. | 325/324 |
| 4,028,684 | 6/1977 | Divine et al. | 340/172.5 |
| 4,061,978 | 12/1977 | Motley et al. | 325/42 |
| 4,270,202 | 5/1981 | Stuttard et al. | 370/80 |
| 4,493,951 | 1/1985 | Sanderson et al. | 179/175.3 |
| 4,542,453 | 9/1985 | Patrick et al. | 364/200 |
| 4,756,007 | 7/1988 | Qureshi et al. | 375/37 |
| 4,780,883 | 10/1988 | O'Connor et al. | 375/7 |
| 4,956,852 | 9/1990 | Hodge | 375/8 |
| 5,031,195 | 7/1991 | Chevillat et al. | 375/14 |
| 5,038,365 | 8/1991 | Belloc et al. | 375/8 |
| 5,127,051 | 6/1992 | Chan et al. | 380/49 |
| 5,134,648 | 7/1992 | Hochfield et al. | 379/98 |
| 5,228,077 | 7/1993 | Darbee | 379/102 |
| 5,333,149 | 7/1994 | Vicard et al. | 375/14 |
| 5,418,524 | 5/1995 | Fennell | 340/825.22 |
| 5,481,742 | 1/1996 | Worley et al. | 395/800 |
| 5,524,122 | 6/1996 | Lepitre et al. | 375/222 |

FOREIGN PATENT DOCUMENTS

| | | |
|---|---|---|
| 2 043 308 | 10/1980 | United Kingdom . |
| 2 250 838 | 6/1992 | United Kingdom . |

*Primary Examiner*—Tariq R. Hafiz
*Assistant Examiner*—Todd Ingberg
*Attorney, Agent, or Firm*—Robert P. Sabath; J. P. Violette; Stanley N. Protigal

[57] ABSTRACT

A software patch method and apparatus using a content addressable memory (CAM) to produce a code change enable signal when a program memory address matches a patch memory address, to cause program execution of modem operation to be diverted to the patch code when an address comparison hit is achieved. The patching apparatus includes a program memory for applying program instructions onto a data bus for execution, unless an address comparison of a program address and a patch address causes application of a substitute address onto the data bus.

18 Claims, 9 Drawing Sheets

6,135,651

PATCHING APPARATUS AND METHOD FOR UPGRADING MODEM SOFTWARE CODE

FIELD OF THE INVENTION

This invention relates to modifying code executed by a processor, and more particularly to patching code for debugging and execution in a modem system.

BACKGROUND OF THE INVENTION

As electronic systems develop in complexity and incorporate more and more individual processors and associated software code, upgrading a particular electronic component or processor may impact the performance of other electronic components and processors in the system unless the software relating to the other components and processors is updated as well to accommodate the new component or processor. To improve and enable effective system performance, all or selected portions of software need to be updated from time to time. Such software can be updated either by replacing the entire current software code in memory with updated software or by upgrading individual software portions. In complex systems, the amount of software to be replaced in a full updating of all affected software modules is voluminous. Replacing the entire software code is time-consuming or costly if implemented as firmware or ROM. It is accordingly desirable to develop convenient methods and systems for updating software installed in an electronic component memory without needing to replace the entire software.

SUMMARY OF THE INVENTION

The present invention provides a method and apparatus for replacing selected portions of computer program code prior to the code being computer executed. Selected address locations of computer program code are stored in a patch table for comparison in a content-addressable memory (CAM) with memory address locations indicating code or instructions to be replaced. According to a method of the present invention, a program address for currently installed software and the address locations of the code selected for substitution are compared in an array of CAM memory cells, and a code change enable signal is generated when the program address matches one of the selected address locations identifying code or instructions to be substituted for existing code or instructions. In response to the code change enable signal, one or more replacement instructions are applied onto a selected bus for execution in lieu of the substituted code. Further, reading of substituted program code portions is disabled for a predetermined time period or for a predetermined number of instructions.

Further according to the present invention, an apparatus for replacing computer program code operates during execution of the program containing the software code portions to be replaced. To implement the present invention, a first memory location stores selected address locations of computer program code to be replaced. A second memory location stores instructions corresponding to the address locations containing replacement code content to be executed by the processor instead of the currently stored instructions. A comparator receives currently executed program addresses and compares each address to the address locations of the selected replacement code content. The comparator further provides a code change enable signal, when a currently executed program address matches one of the address instructions selected for replacement. According to the present invention, a controller retrieves replacement code instructions corresponding to particular running program addresses and applies replacement code instructions to a selected bus. The controller further provides a disable signal to the memory storing the computer program code executed by the processor.

DETAILED DESCRIPTION OF THE PREFERRED EMBODIMENTS

Figure 1A:
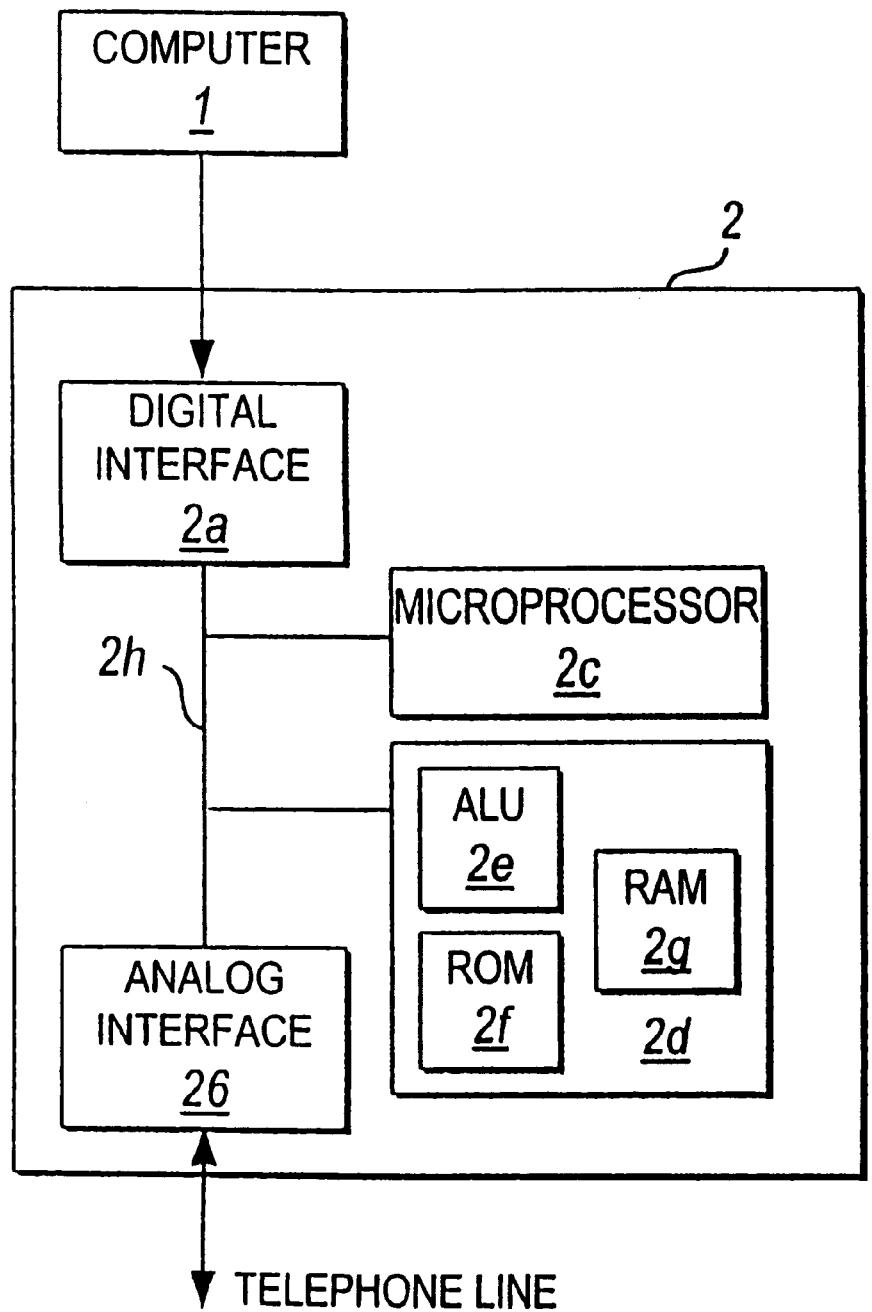
FIG. 1a is a block diagram of a computer and a conventional modem in which an embodiment of the present invention can be operated in connection with the computer.

FIG. 1A is a block diagram of a computer and a conventional modem in which an embodiment of the present invention can be operated in connection with the computer. Computer 1 is a data processing system, a personal computer (PC), or a controller device, which can be interfaced with a modem 2. In particular, computer 1 is connected along a digital line to modem 2 according to the present invention. Modem 2 includes a digital interface 2a and an analog interface 2b connected to a telephone line, for example. Computer 1 is connected to digital interface 2a of modem 2. Modem 2, according to one embodiment of the present invention, includes first and second microprocessors 2c and 2d. Second microprocessor 2d includes an arithmetic logic unit (ALU) 2e, a read only memory (ROM) 2f, and a random access memory (RAM) 2g. Digital interface 2a, analog interface 2b, and first and second microprocessors 2c and 2d are connected to each other on a bus 2h. First microprocessor 2c is assigned to control modem operations. Second microprocessor 2d operates as a signal processor.

Figure 1B:
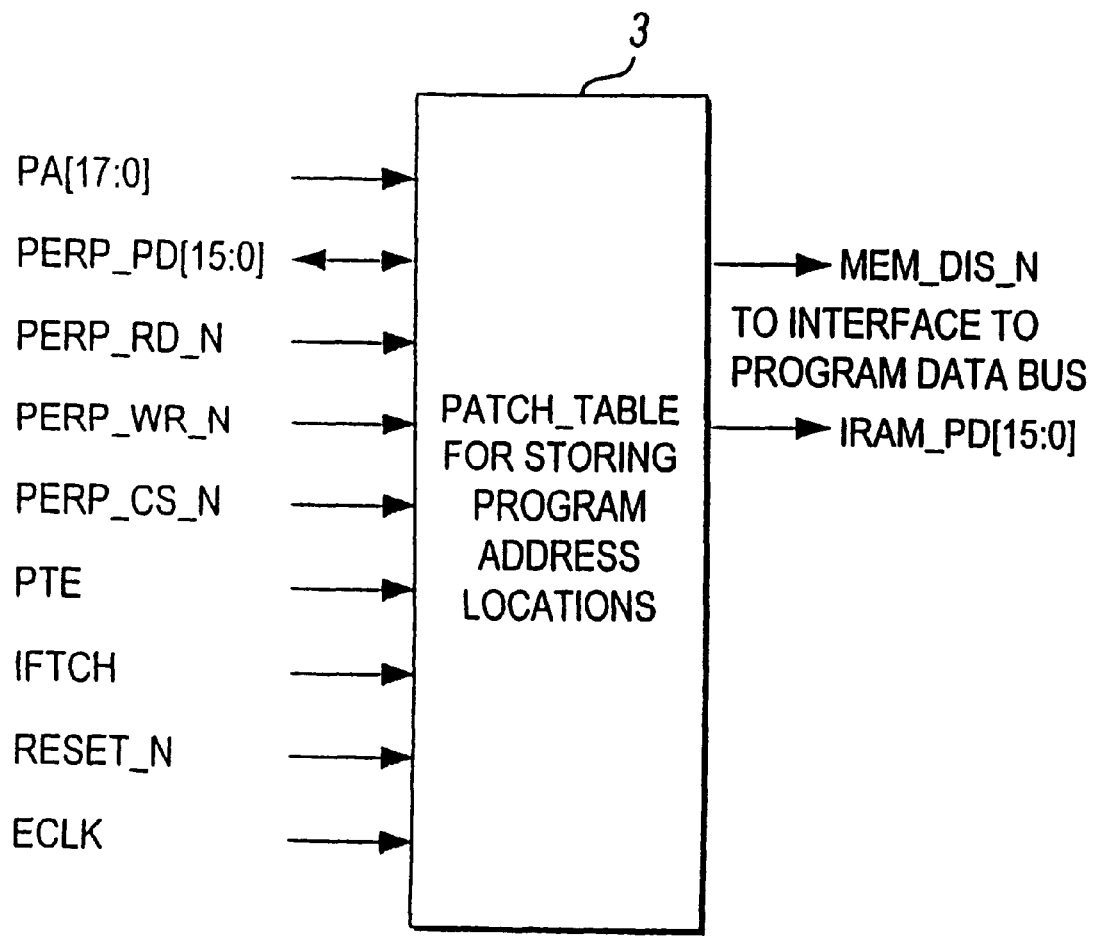
FIG. 1b is a block diagram of a programmable patch table, according to the present invention.

FIG. 1B is a block diagram of a programmable patch table 3 included within the second microprocessor 2d of FIG. 1A according to the present invention. Patch table 3 includes, according to one embodiment, an 18 bit wide program address input port PA[17:0], a 16 bit wide input/output peripheral data bus PERP_PD[15:0], a peripheral read enable input port PERP_RD_N, a peripheral write enable input port PERP_WR_N, a peripheral chip select input port PERP_CS_N, a patch table enable input port PTE, an instruction fetch input port IFTCH, a synchronized reset input port RESET_N, an early clock input ECLK, a program memory output disable output port MEM_DIS_N, and an internal program memory data bus output port IRAM_PD. Programmable patch table 3 stores address locations at which software patches are to be introduced. As will be discussed in detail below, the patch address locations stored in programmable patch table 3 are compared with current program code addresses which are reached during program execution according to the present invention. If the current program code address is the same as a patch address location stored in programmable patch table 3, then a hit signal is generated which results in a software interrupt which is followed by execution of substitute code until a return to the original code is made following the replaced code.

Figure 2:
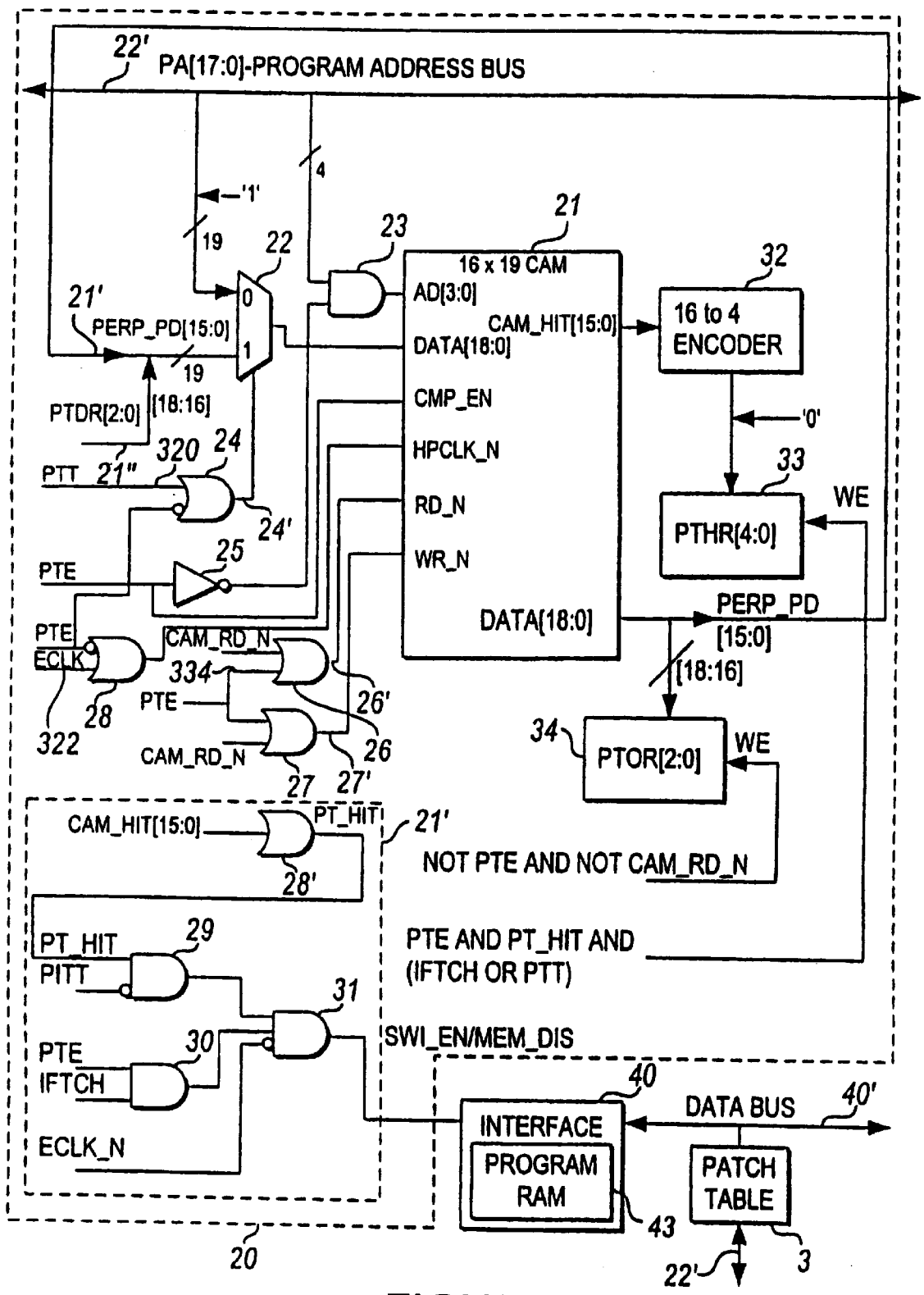
FIG. 2 is a block diagram of a logic circuit for generating a hit event in accordance with the present invention.

FIG. 2 is a block diagram of a logic circuit 20 for generating a hit event in accordance with the present invention. Logic circuit 20 is connected to patch table 3 through an interface circuit 40 including a program RAM 43, and a data bus 40', as discussed in detail below. Logic circuit 20 includes a content addressable memory (CAM) 21 for storage of patch addresses, an address multiplexer 22, a patch table addresser 23, an address multiplexer switch 24, a patch table enabler 25, a read enable OR gate 26, a write enable OR gate 27, a clock enabler OR gate 28, a single input OR gate 28', respective AND gates 29 (with a single inverting input), 30 (without an inverting input) and 31 (with a single inverting input), a 16 to 4 encoder 32, register element 33, and register element 34. Logic circuit 20 further includes single input OR gate 28' and AND gates 29–31. According to the present invention, a patch table enable signal PTE is applied through indicated components to an enable input of CAM memory 21 to enable comparison of program addresses with the selected addresses stored in CAM memory 21. Patch table enable signal PTE is particularly applied to an inverted input of address multiplexer switch 24. Another input of address multiplexer switch 24 receives patch table test signal PTT. Address multiplexer switch 24 provides a multiplexer switch signal on line 24' to address multiplexer 22 which switches between applying either a program address on line 22' or a combination of peripheral data bus line 21' and patch table data register information on line 21" to the data input DATA[18:01] of CAM memory 21. Patch table enabler 25 inverts patch table enable signal PTE and provides the inverted signal to an input of the patch table address AND gate 23. Thus, a program address 22' is applied to patch table address AND gate 23 and to address input AD[3:0] of CAM memory 21. CAM memory 21 receives a clocking signal on line 28' from clock enable OR gate 28 which has a patch table enable signal PTE applied to a first input thereof and has an early clock signal ECLK applied to a second input thereof. A memory read enable signal CAM_RD_N is applied to a first input of the read enable OR gate 26. Patch table enable signal PTE is applied to a second input of the read enable OR gate 26, which generates in response thereto a read enable signal RD_N on line 26' which is applied to a read enable input of CAM memory 21. Similarly, patch table enable signal PTE is applied to one input of write enable OR gate 27, and a memory write enable signal CAM_WR_N is applied to another input of the write enable OR gate 27, which generates in response thereto a write enable signal on line 27' which is applied to a write enable input WR_N of CAM memory 21. Further, FIG. 2 shows, in detailed block diagram form, the circuitry which generates a hit signal CAM_HIT upon successful comparison. When a hit is made, the hit signal CAM_HIT is provided to 16 to 4 encoder 32 according to one embodiment, and then to register 33. The patch addresses are provided from patch table 3 and stored in a content addressable memory (CAM) 21. According to one embodiment, CAM 21 is 19 bits wide and has 16 entries. Bits 0–17 of CAM 21 correspond to CAM addresses, and bit 18 of CAM 21 specifies whether the entry is valid. If patch table enable bit PTE is set, CAM 21 is enabled for comparison operation. Program addresses are compared to CAM entries, and a hit signal is generated when the compare operation is successful. The hit entry is encoded and stored into patch table hit register (PTHR) 33 for further software use. The hit signal is used to generate a software interrupt enable signal SWI_EN to force SWI instruction onto the program data bus and to disable current program memory read output. CAM 21 can be accessed for read/write only when it is disabled for compare operation. Since the data bus is of limited width, CAM 21 is loaded in first and second stages. In a first stage of operation, higher order bits 18:16 of the data bus are written to a patch table data register PTOR[2:0] 34. In a second CAM loading stage, CAM 21 is written using the peripheral data bus and the PTOR[2:0]. The CAM entries can thus be read out onto the peripheral data bus. A test mode of operation, according to the present invention, allows for testing of CAM 21. In particular, a write to patch table test address location 0017 sets the PTT signal, causing CAM 21 to compare PERP_PD and PTDR with particular CAM entries. The PTHR register further can be read to check if there was a hit. In the test mode, interrupt generation is disabled. The registers associated with this module and the CAM are memory mapped to the program memory space shown in Table 1.

TABLE 1

Patch Table Memory Map

| Register Name | Access Mode | Address |
| --- | --- | --- |
| Break table data register PTDR | Read/Write | 00015 |
| Break table hit register PTHR | Read/Write | 00016 |
| Reserved for patch table test | Write | 00017 |
| Patch table output register PTOR | Read/Write | 00018 |
| Reserved | | 00019-0 001F |
| Patch table/CAM (16 entries) | Read/Write | 00020-0 002F |

Figure 3:
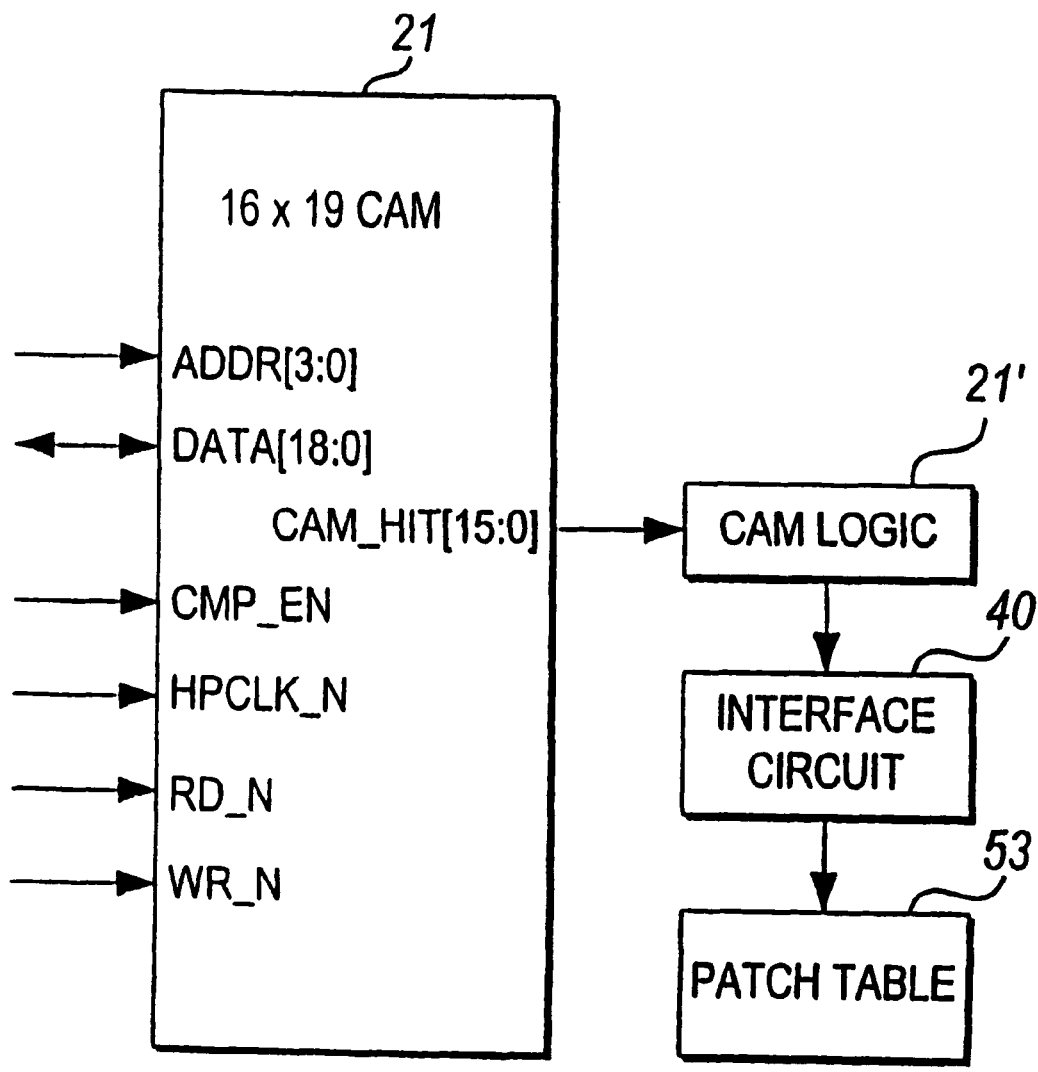
FIG. 3 is a block diagram of a content addressable memory (CAM) according to the present invention.

FIG. 3 is a block diagram of a circuit according to the present invention including content addressable memory (CAM) 21, CAM logic circuit 21', an interface circuit 40, and patch table 53. CAM 21 particularly includes a 4 bit CAM address input port ADDR[3:0], a 19 bit CAM data input/output for read/write/compare input port DATA[18:0], a compare enable input port CMP_EN (which when high, enables CAM memory 21 to compare DIN with CAM entries and to generate HIT signals), an input clock signal port HPCLK_N for precharging HIT lines, a CAM read signal input port RN_N, a CAM write signal input port WR_N, and CAM hit output lines HIT[16:0].

Figure 4:
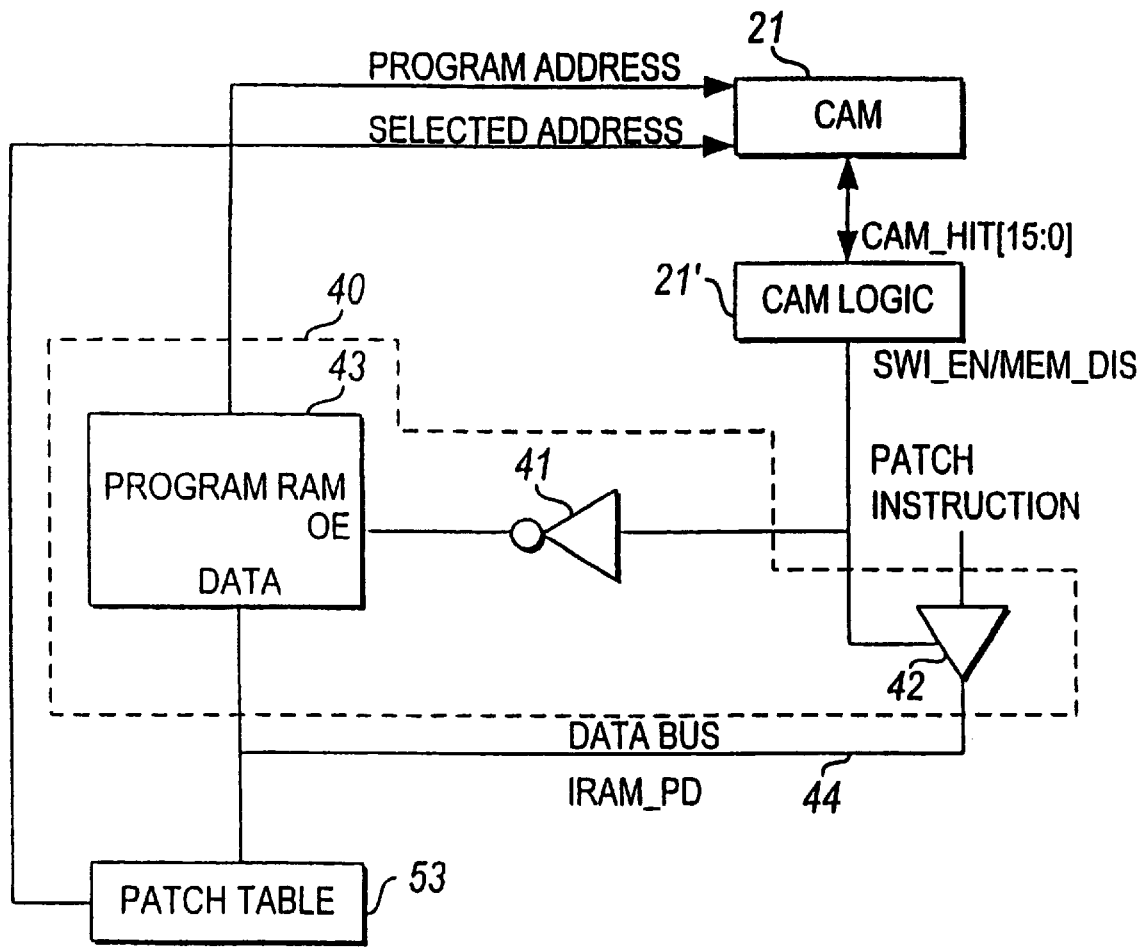
FIG. 4 is a block diagram of an interface circuit for a program data bus which is used to implement interrupt operations according to the present invention.

Referring to FIG. 4, there is shown a block diagram of an interface circuit 40 connected to CAM logic circuit 21' which in turn is connected to CAM 21 according to the present invention. Interface circuit 40 includes buffers 41 and 42, and a program random access memory (RAM) 43. The connection of interface circuit 40 to CAM logic circuit 21' provides switch instruction enable and memory disable signal SWI_EN/MEM_DIS to interface circuit 40. The connection of CAM 2 to CAM logic circuit 21' provides hit signal CAM_HIT[15:0] to CAM logic circuit 21' when a program address is encountered. In particular, the hit signal is provided when a program address is the same as a selected address indicative of a patch software instruction which is intended to replace a specific program instruction. The hit signal is provided to CAM logic circuit 21' to produce a switch and memory disable signal which causes a selected instruction from patch table 53 to be placed on data bus 44 in lieu of a counterpart instruction from program RAM 43 which would otherwise be applied onto bus 44 through output DATA of program RAM 43. Interface circuit 40 receives a switch instruction which is applied to buffer 42. Enable signals are received by buffers 41 and 42. An interrupt enable signal is applied to an input of the memory disable buffer 41 which inverts the enable signals SWI_EN/MEM_DIS to disable the OR output enable port of program RAM 43. The disable signal is applied to an input of interrupt instruction buffer 42 to enable buffer 42 to provide the interrupt instruction applied to its input to program data bus 44.

Figure 5:
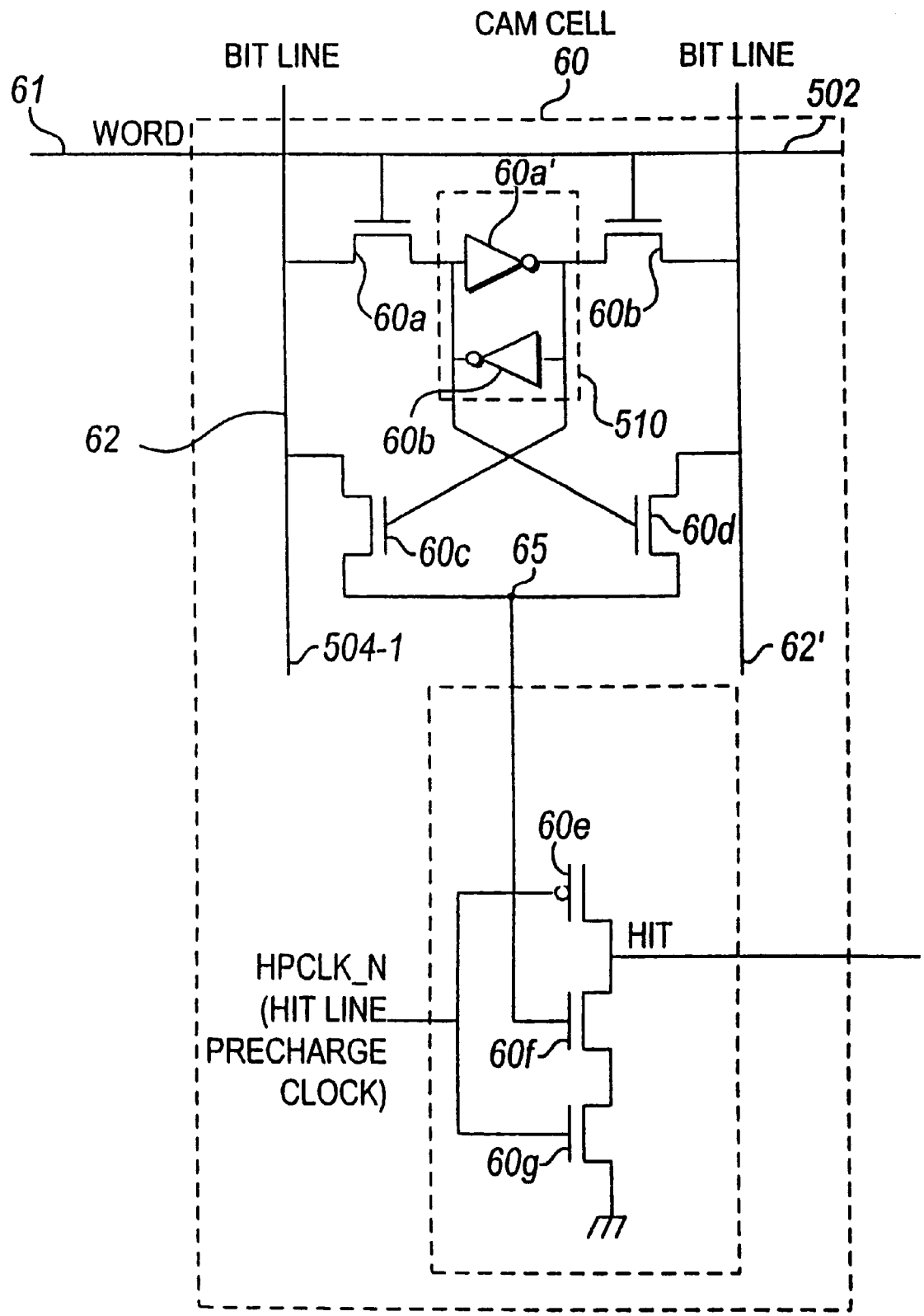
FIG. 5 is a circuit diagram of a CAM memory cell according to the present invention.

FIG. 5 is a circuit diagram of a content addressable memory (CAM) cell 60 according to one embodiment of the present invention. CAM memory 50 in FIG. 4 includes a plurality of memory cells 60 arranged in rows and columns. CAM cell 60 further includes transistors 60e, 60f, and 60g, which are connected in series between a power source and ground. The gate of transistor 60f is connected to transistors 60c and 60d. The gates of transistors 60e and 60f are connected to each other through an inversion, and the gates are provided with a hit line precharge clock signal HPCLK_N on line 63. Each row of memory cells 60 is coupled to a corresponding word line 61. A column of memory cells 60 is coupled to bit lines 62 and 62' which each carry voltage signals indicative of respective logic levels to be stored in a selected memory cell in a conventional manner. Word line 61 is coupled to the gate inputs of field effect transistors 60a and 60b. Transistors 60a and 60b are respectively coupled to respective bit lines 60 and 62'. Inverters 60b' and 60a' are coupled together so that the output of each of inverters 60a' and 60b' is coupled to the input of the other inverter 60a' and 60b'. Transistors 60a and 60b are coupled to respective inputs of respective inverters 60a' and 60b'. CAM cell 60 includes a word line 61, first and second bit lines, respectively 62 and 62', a hit line precharge clock (HPCLK_N) line 63, and a hit line 63'. CAM cell 60 further includes first and second transistors, respectively 60a and 60b, which are connected to each other in series between respective bit lines 62 and 62'. CAM cell 60 further includes third and fourth transistors, respectively 60c and 60d, which are connected to each other in series between respective bit lines 62 and 62'. CAM cell 60 further includes first and second inverters respectively 60a' and 60b' which are connected in parallel between first and second transistors 60a and 60b. Each of inverters 60a' and 60b' has an anode and cathode. The anode of inverter 60a' is connected to the cathode of inverter 60b'. The gates of 60a and 60b are connected to word line 61. The gate of transistor 60c is connected to the cathode of inverter 60a' and to the anode of inverter 60b'. The gate of transistor 60d is connected to the anode of inverter 60a' and to the cathode of inverter 60b'. CAM cell 60 further includes transistors 60e, 60f, and 60g, which are connected in series between a power source and ground. The gate of transistor 60f is connected to transistors 60c and 60d. The gates of transistors 60e and 60f are connected to each other through an inversion, and the gates are provided with a hit line precharge clock signal HPCLK_N on line 63. When enabled, transistors 60a and 60b allow the signal levels of bit lines 62 and 62' to be applied to the respective inputs of inverters 60a' and 60b' to maintain a selected signal at their respective outputs when transistors 60a and 60b are disabled. The output of inverter 60a' is applied to a gate of a transistor 60c coupled to bit line 62. The output of inverter 60b' is coupled to the gate of a transistor 60d which is coupled to bit line 62'. The remaining terminals of the transistors 60c and 60d are coupled together at a common node 65.

Figure 6:
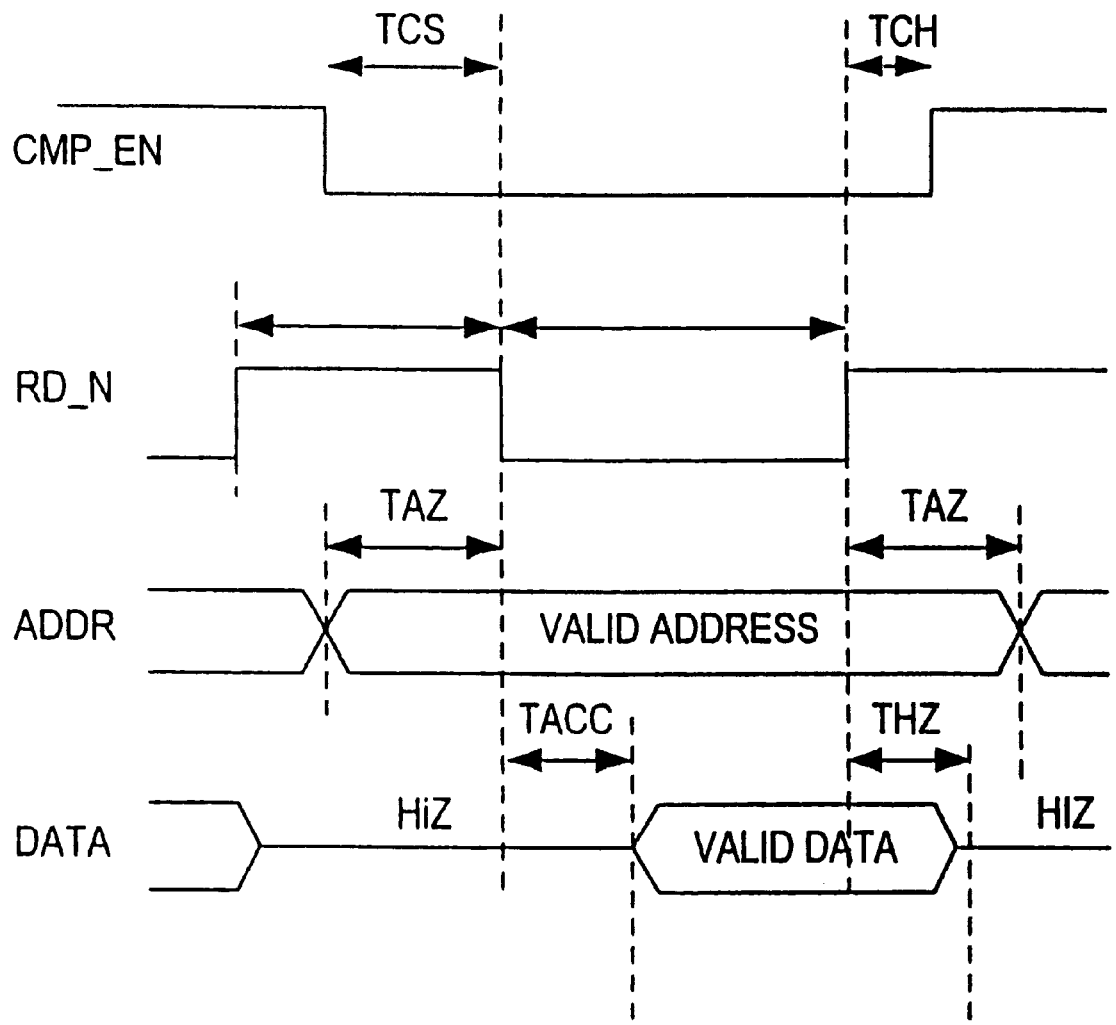
FIG. 6 is a timing diagram for CAM read access according to the present invention.

FIG. 6 is a timing diagram for implementing CAM read access according to one embodiment of the present invention. A selected CAM cell 60 in FIG. 5 can be read, according to the present invention, when it receives a read pulse RD_N from OR gate 26 in FIG. 2. For read operation to begin, CAM cell 60 additionally receives a compare enable signal CMP_EN which goes to a zero logical state to enable read operation to begin. A valid address of data to be read is provided at least an address setup period prior to expiration of the read pulse. Then the data to be read is received after the access time for a read low has expired. The valid address is maintained for the duration of data read operation, for a predetermined period during a succeeding read pulse.

Figure 7:
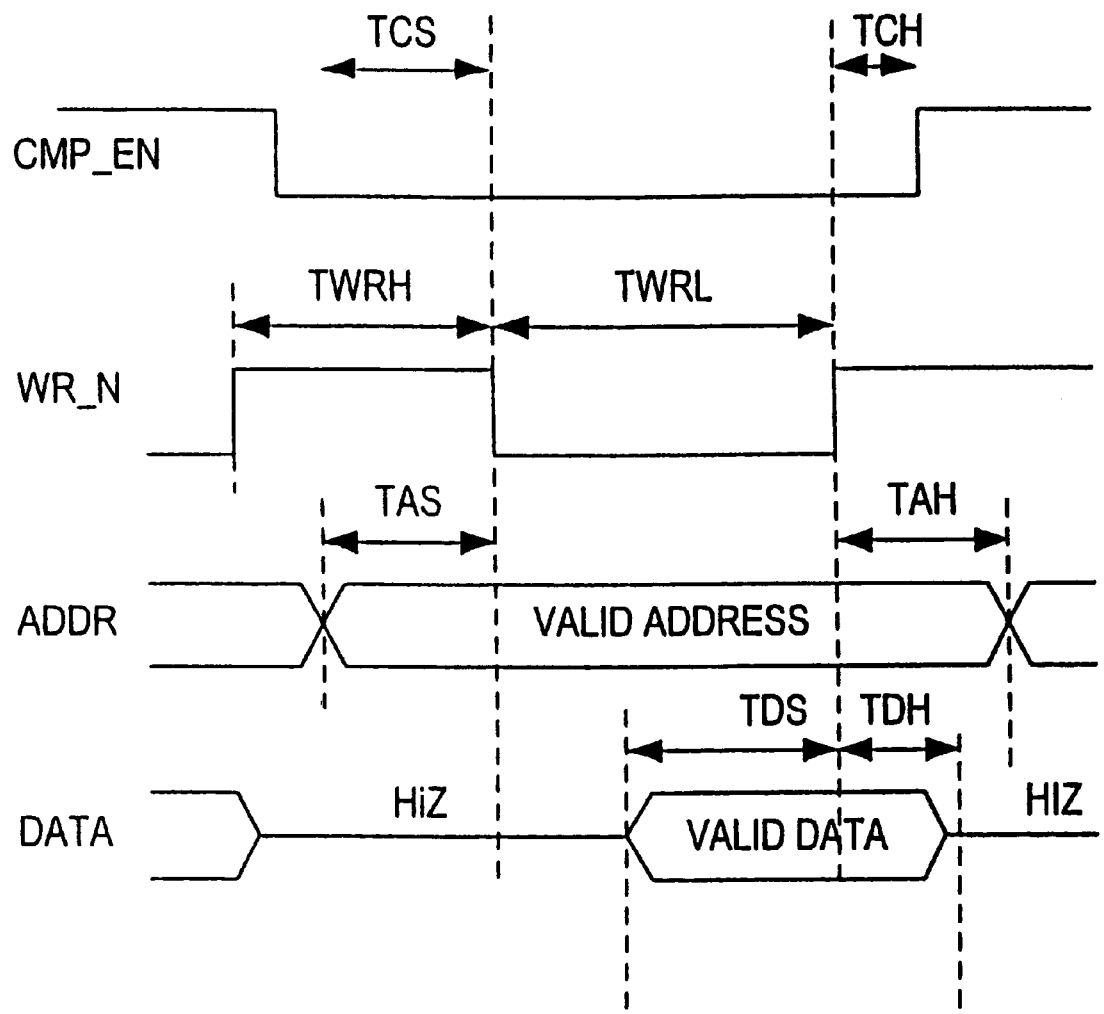
FIG. 7 is a timing diagram for CAM write access according to the present invention.

FIG. 7 is a timing diagram for implementing CAM write access according to one embodiment of the present invention. A selected CAM cell 60 in FIG. 5 can be subject to write operation, according to the present invention, when it receives a write pulse WR_N from OR gate 27 in FIG. 2. For write operation to begin, CAM cell 60 additionally receives a compare enable signal CMP_EN which goes to a zero logical state to enable read operation to begin. A valid address of data to be read is provided at least an address setup period prior to expiration of the read pulse. Then the data to be read is received after the access time for a read low has expired. The valid address is maintained for the duration of data read operation, for a predetermined period during a succeeding read pulse.

Figure 8:
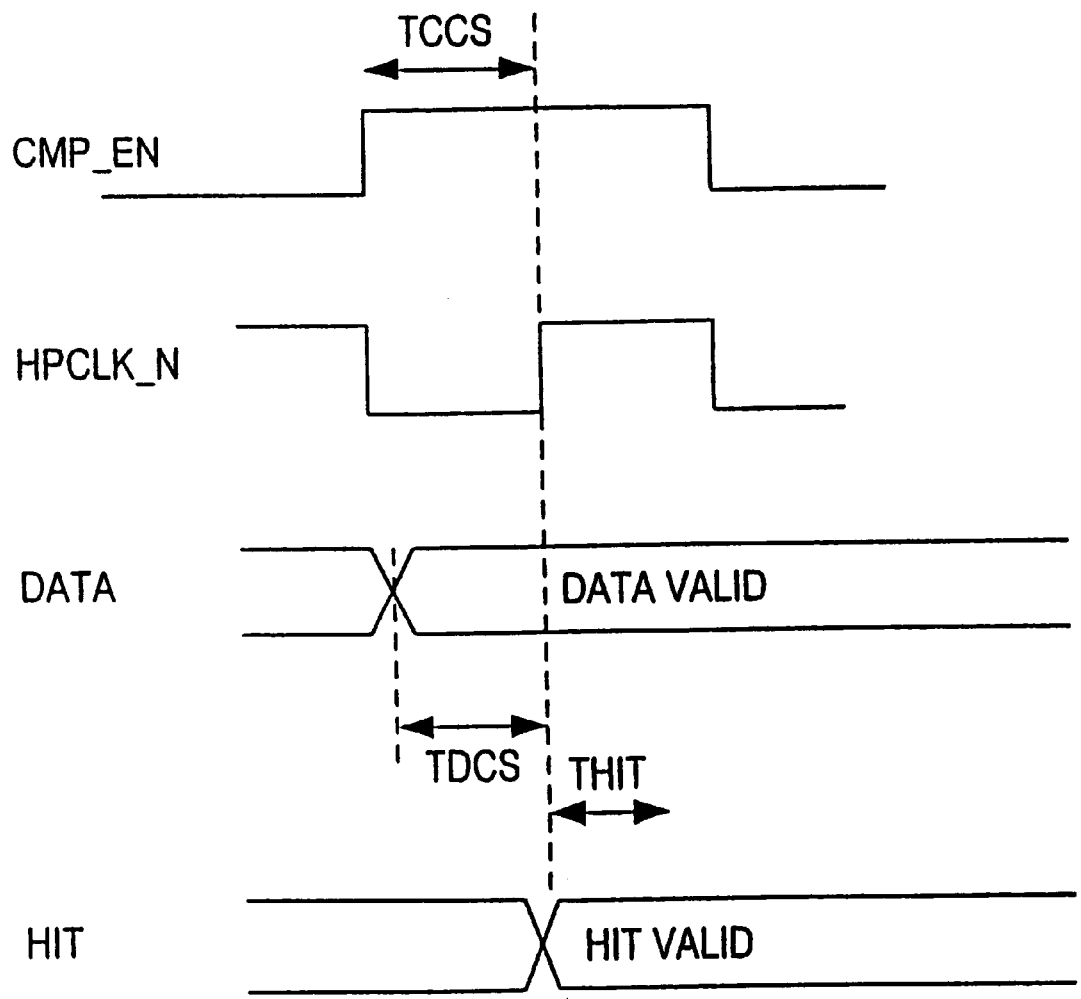
FIG. 8 is a timing diagram of CAM hit access operation according to the present invention.

FIG. 8 is a timing diagram for CAM hit access operations according to one embodiment of the present invention. A hit is accomplished for a particular CAM cell 60 according to the present information when stored information in CAM cell 60 matches input information after receipt of a compare enable CMP_EN signal and receipt of valid data for a predetermined interval of time. For valid data, the rising edge of a clock signal HPCLK_N causes production of a hit valid signal.

What is claimed is:

1. A method for replacing particular instructions in computer program code being executed in a predetermined peripheral communication device for a computer, said instructions being identified by corresponding computer program code addresses, said method comprising:

storing selected addresses identifying instructions of computer code for execution by said peripheral communication device subject to replacement by at least a single replacement code instruction;

providing said addresses identifying instructions of computer code for execution by said peripheral communication device subject to replacement to a first buffer and using said first buffer to selectively apply a memory disable signal if computer code for execution by said peripheral communication device is to be replaced by patch instructions;

comparing at least a single program code address and said selected addresses; and generating a code change enable signal when any of said addresses matches one of said selected address locations and selectively transmitting said enable signal through a second buffer when program code for execution by said peripheral communication device to be replaced by patch instructions is encountered during said comparing of the program code address and selected addresses.

2. The method of claim 1 further comprising:
disabling the reading of a current program code instruction; and
providing a replacement instruction for execution by the computer.

3. The method according to claim 1 further comprising using a content addressable memory (CAM) to compare said computer program code address and said selected addresses.

4. The method according to claim 1 wherein said selected addresses are stored in a patch table.

5. The method according to claim 1 further comprising using a content addressable memory (CAM) to generate said code change enable signal.

6. The method of claim 1 further comprising:
the step of storing selected addresses identifying instructions including providing respective memory disable and patch enable signals to said first and second buffers.

7. An apparatus for changing computer program code executed by a peripheral communication device for a computer, comprising:
a first memory for storing selected addresses identifying program code instructions to be replaced;
a second memory for storing instructions corresponding to selected addresses which are to be executed in lieu of program instructions to be replaced; and
a comparator having an input for receiving a currently executed program address coupled to the second memory for receiving selected address locations, and having an output for providing a code change enable signal when a currently executed program address matches one of selected address locations;
a first buffer coupled to said addressable memory and said comparator, said first buffer being effective for selectively applying a memory disable signal to said memory RAM when program code for execution by said peripheral communication device to be replaced by patch instructions is encountered; and
a second buffer for selectively applying selected patch instructions onto said data bus, wherein said second buffer is coupled to said comparator, said second buffer being effective for applying patch instructions onto said data bus in response to hit signals from said comparator.

8. The apparatus according to claim 7 further comprising a memory circuit coupled to the output of said comparator, and an interface circuit, said interface circuit including an addressable memory containing program code for execution by said peripheral communication device including instructions to be replaced by selected patch instructions.

9. The apparatus according to claim 8 further comprising a data bus connected to said addressable memory for carrying instructions to be executed.

10. The apparatus according to claim 9 including a patch table connected to said addressable memory.

11. The apparatus according to claim 8 wherein said comparator includes a content addressable memory.

12. An apparatus for changing computer program code executed by a peripheral communication device for a computer, the apparatus comprising:
a first memory for storing selected addresses identifying program code instructions to be replaced;
a second memory for storing instructions corresponding to selected addresses which are to be executed in lieu of program instructions to be replaced;
a comparator having an input for receiving a currently executed program address coupled to the second memory for receiving selected address locations, and having an output for providing a code change enable signal when a currently executed program address matches one of selected address locations;
a memory circuit coupled to the output of said comparator, said interface circuit including an addressable memory containing program code for execution by said peripheral communication device including instructions to be replaced by selected patch instructions;
a first buffer coupled to said addressable memory and said comparator, said first buffer being effective for selectively applying a memory disable signal to said memory RAM when program code for execution by said peripheral communication device to be replaced by patch instructions is encountered;
a data bus connected to said addressable memory for carrying instructions to be executed;
a patch table connected to said addressable memory; and
a second buffer for selectively applying selected patch instructions onto said data bus, wherein said second buffer is coupled to said comparator, said second buffer being effective for applying patch instructions onto said data bus in response to hit signals from said comparator.

13. The apparatus according to claim 12 wherein said comparator includes a content addressable memory.

14. An apparatus for changing computer program code executed by a peripheral communication device for a computer, the apparatus comprising:
a first memory for storing selected addresses identifying program code instructions to be replaced: a second memory for storing instructions corresponding to selected addresses which are to be executed in lieu of program instructions to be replaced;
a comparator having an input for receiving a currently executed program address coupled to the second memory for receiving selected address locations, and having an output for providing a code change enable signal when a currently executed program address matches the of selected address locations;
a memory circuit coupled to the output of said comparator, said interface circuit including an addressable memory containing program code for execution by said peripheral communication device including instructions to be replaced by selected patch instructions;
a first buffer coupled to said addressable memory and said comparator, said first buffer being effective for selectively applying a memory disable signal to said memory RAM when program code for execution by said peripheral communication device to be replaced by patch instructions is encountered;
a data bus connected to said addressable memory for carrying instructions to be executed; a patch table connected to said addressable memory;
a second buffer for selectively applying selected patch instructions onto said data bus; and
a logic circuit connected to said comparator and said first and second buffers, said logic circuit effective for transmitting respective memory disable and patch enable signals to said first and second buffers.

15. The apparatus according to claim 14 wherein said comparator includes a content addressable memory.

16. An apparatus for applying patch instructions onto a data bus connected to a program memory in lieu of selected program instructions for execution by a peripheral communication device, said apparatus comprising:

a random access memory containing program instructions at selected program addresses;

a data bus connected to said random access memory;

a content addressable memory connected to said random access memory and containing the addresses of instructions applied to said data bus; and a patch table containing patch addresses for patch instructions to be provided to said content addressable memory, said patch addresses being provided to said content addressable memory for comparison with said program addresses to determine whether or not to apply a patch instruction rather than a program instruction for execution by said peripheral communication device to said data bus;

a comparator having an input for receiving a currently executed program address coupled to the second memory for receiving selected address locations, and having an output for providing a code change enable signal when a currently executed program address matches one of selected address locations; and a logic circuit connected to said comparator and said first and second buffers, said logic circuit effective for transmitting respective memory disable and patch enable signals to said first and second buffers.

17. The apparatus according to claim 16 including a buffer circuit for receiving patch instructions for application onto said data bus.

18. The apparatus according to claim 17 including a logic circuit connected to said content addressable memory to determine whether to enable said buffer circuit to apply a selected patch instruction onto said data bus.

* * * * *